United States Patent Office 3,483,147
Patented Dec. 9, 1969

3,483,147
POLYURETHANES FROM HYDROXY
CONTAINING PHOSPHITES
Lester Friedman, Beachwood, Ohio, assignor to Weston
Chemical Corporation, Newark, N.J., a corporation of
New Jersey
No Drawing. Original application Oct. 23, 1965, Ser. No.
504,153. Divided and this application July 18, 1968,
Ser. No. 777,514
Int. Cl. C08g 22/16, 22/10
U.S. Cl. 260—2.5    8 Claims

ABSTRACT OF THE DISCLOSURE

Polyurethanes are prepared by reaction of polyisocyanates with phosphates having one of the formulae (a)
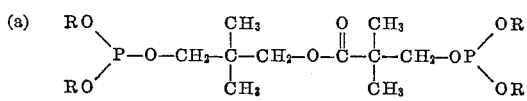

and (b)
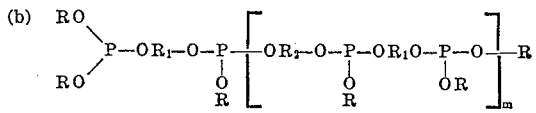

where
R is selected from the group consisting of $HOC_nH_{2n}O-$
and $HOC_xH_{2x}(OC_xH_{2x})_y-$
$R_2$ is selected from the group consisting of $-C_nH_{2n}-$
and $-C_xH_{2x}(OC_xH_{2x})_y-$;
$R_1$ is

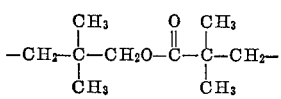

$n$ is an integer of at least 4, there also being at least
four carbon atoms separating the oxygen atoms attached to $C_nH_{2n}$; $x$ is an integer of 2 to 4 inclusive,
$y$ is an integer of at least 1 and $m$ is a small integer
of at least 1.

---

This application is a division of my copending application, Ser. No. 504,153, filed Oct. 23, 1965.

The present invention relates to novel phosphites and to polyurethane prepared therefrom.

It is an object of the present invention to prepare novel phosphites which are stable to hydrolysis, heat and light.

Another object is to prepare flame proof polyurethane foams.

A more specific object is to prepare rigid, non-burning closed all urethane polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing novel phosphites having the formula

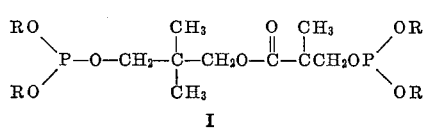

and polymers of such phosphites having the formula

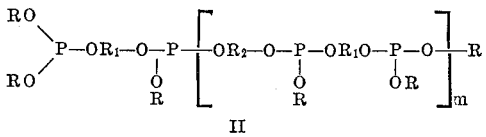

where R is a residue of an alkylene glycol or a polyalkylene glycol having 2 to 4 carbon atoms in the alkylene group and from which one of the hydroxyl groups has been removed (thus R can be $HOC_nH_{2n}O-$ or $HOC_xH_{2x}(OC_xH_{2x})_y-$ where $x$ is an integer of 2 to 4 inclusive and $y$ is an integer of at least 1), $R_2$ is a residue of an alkylene glycol or a polyalkylene glycol having 2 to 4 carbon atoms in the alkylene group and from which both of the hydroxyl groups have been removed, (thus $R_2$ can be $-C_nH_{2n}-$ or $C_xH_{2x}(OC_xH_{2x})_y$), $R_1$ is the group

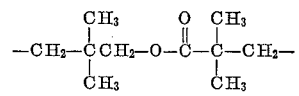

and $m$ is a small whole number e.g. 1, 2, 3, 4, 5 or 6. It will be observed that if $n$ in the Formula II were zero then Formula II would become Formula I.

The compounds of Formula I are prepared in a first procedure by reacting 2 moles of a trihydrocarbyl or trihaloaryl phosphite with 1 mole of 2,2-dimethyl-3-hydroxypropyl - 2,2 - dimethyl - 3 - hydroxy - propionate (Ester diol 204) and 4 moles of a glycol having at least 4 atoms separating the hydroxyl groups, preferably a polyalkylene glycol. Usually a slight excess of the polyalkylene glycol, e.g. 1–10% is used. The reaction is preferably carried out in the presence of a dihydrocarbyl or dihaloaryl phosphite or an alkaline catalyst in an amount of 0.05–5% by weight of the phosphite reactant.

A second method of preparing the compounds of Formula I is to heat two moles of a tris (polyalkylene glycol) phosphite with 1 mole of Ester diol 204 in the presence of 0.05–5% by weight of the phosphite of an alkaline catalyst or a dihydrocarbyl or dihaloaryl phosphite and distill out two moles of polyalkylene glycol.

The compounds of Formula I can also be prepared in a third procedure by heating 2 moles of a hydrocarbyl bis (polyalkylene glycol) phosphite with 1 mole of Ester diol 204 and removing the monohydric alcohol or phenol formed.

The compounds of Formula II are most conveniently formed by heating the compounds of Formula I in a vacuo and removing 1 mole of polyalkylene glycol for each value of $m$ desired, e.g. if $m$ is 1, then one mole of polyalkylene glycol should be removed and if $m$ is three, then three moles of polyalkylene glycol should be removed.

Examples of suitable catalysts are dialkyl or diaryl or dihaloaryl phosphites such as diphenyl phosphite, di-o-cresyl phosphite, di-p-cresyl phosphite, didecyl phosphite, diisodecyl phosphite, dioctadecyl phosphite, dimethyl phosphite, diethyl phosphite, di-o-chlorophenyl phosphite, di-2,4-dichlorophenyl phosphite or alkaline catalysts such as sodium phenolate, sodium methylate, sodium cresylate, potassium phenolate, sodium isodecylate. The alkaline catalysts preferably have a pH of at least 11 in an 0.1 N solution.

The phosphites of Formulae I and II are remarkably stable toward hydrolysis, heat and light.

All of the phosphites of the present invention are useful in imparting stability against light and polymer degradation to polyvinyl chloride, and other vinyl chloride polymers, e.g., vinyl chloride vinylidene chloride copolymer (80:20), vinyl chloride-vinyl acetate (87:13). They also are stabilizers for monoolefin polymers such as polyethylene, polypropylene, ethylene-propylene copolymers (e.g., 50:50, 80:20 and 20:80), ethylene-monoolefin copolymers wherein the monoolefins have 4–10 carbon atoms and is present in a minor amount, e.g., ethylene-butene-1 copolymer (e.g., 95:5) and ethylene decene-1 copolymer. Furthermore, they can be used to stabilize natural rubber, styrene-butadiene rubber (SBR rubber) ethylene-propylene-nonconjugated diene terpolymers, e.g., ethylene-propylene dicyclopentadiene (e.g., 57:42:3), polybutadiene and poly cis isoprene. Also, they are stabilizers for polyesters, e.g., styrene modified diethylene glycol adipate-maleate. The compounds of the present invention are normally employed in an amount of 0.25 to 10% by weight of the polymer they are intended to stabilize. They are particularly good as thermal stabilizers. They are particularly useful in forming rigid non-burning closed all urethane polymers having good flame resistance and resistance to hydrolysis.

In preparing the compounds of Formula I by the first procedure the trihydrocarbyl or trihaloaryl phosphite can be for example trimethyl phosphite, triethyl phosphite, tripropyl phosphite, triamyl phosphite, tris octyl phosphite, tris isodecyl phosphite, tris dodecyl phosphite, tris octadecyl phosphite or other trialkyl phosphite, triphenyl phosphite, tri-o-cresyl phosphite, tri-p-cresyl phosphite, tri-m-cresyl phosphite, tri-xylenyl phosphite or other triaryl phosphite, phenyl diisodecyl phosphite, diphenyl p-chlorophenyl phosphite, tri-p-chlorophenyl phosphite, tri-o-chlorophenyl phosphite.

As the alkylene glycol or polyalkylene glycol there can be used dipropylene glycol, tripropylene glycol, tetrapropylene glycol, polypropylene glycol molecular weight 425, polypropylene glycol molecular weight 1000, polypropylene glycol 2025, diethylene glycol, triethylene glycol, tetraethylene glycol, polyethylene glycol molecular weight 1000, ditetramethylene glycol, tritetramethylene glycol, tetramethylene glycol. Generally the polyalkylene glycol does not have a molecular weight much above 1000 and preferably it is considerably lower. The preferred polyalkylene glycol is dipropylene glycol containing a majority of secondary alcohol groups and such was used as the dipropylene glycol in the examples. It will be observed that polypropylene glycol 2025 has about 34 repeating oxypropylene groups, i.e., $y$ as shown is about 34.

There should be at least four atoms separating the hydroxyl groups in the glycol to prevent ring formation in the phosphite reaction.

In using the second procedure there can be employed tris (dipropylene glycol) phosphite, tris (tripropylene glycol) phosphite, tris (polypropylene glycol 425) phosphite, tris (diethylene glycol) phosphite, tris (tetramethylene glycol) phosphite, tris ditetramethylene glycol) phosphite, tris (triethylene glycol) phosphite or the like. These tris (polyalkylene glycol) phosphites can be prepared using the procedure of Friedman patent 3,009,939.

In the third procedure there can be used as the starting phosphite, phenyl bis (dipropylene glycol) phosphite, decyl bis (dipropylene glycol) phosphite, phenyl bis (diethylene glycol) phosphite and similar phosphites.

EXAMPLE 1

A mixture of 620 grams (2 moles) of triphenyl phosphite, 204 grams (1 mole) of Ester diol 204, 560 grams (4.15 moles, a slight excess) of dipropylene glycol and 10 grams of sodium phenolate (catalyst) where heated to 120–130° C. and the phenol formed in the reaction removed via a 10 plate fractionating column at 15 mm. Hg pressure. Towards the end of the reaction the pressure was lowered to 5 mm. and the excess dipropylene glycol removed. The residue was treated with Attagel (attapulgus clay) and Hi-Flo (filter aid) and filtered hot to yield about 790 grams of tetra (dipropylene glycol) Neo Carboxylate diphosphite as a fluid liquid, hydroxyl number found 277 and 283 (theory 280).

EXAMPLE 2

The product of Example 1 was heated in vacuo to 150° C. to yield higher polymers with the formulation of dipropylene glycol as the by-product. By removing one mole of dipropylene glycol the product had average molecular structure for hexa (dipropylene glycol) di (Neo Carboxylate) tetraphosphite.

By heating in vacuo until 2 moles of dipropylene glycol were removed the product was octa (dipropylene glycol) tri (Neo Carboxylate) hexaphosphite.

EXAMPLE 3

The procedure of Example 1 was repeated using 4.15 moles of triethylene glycol in place of the dipropylene glycol to produce tetra (triethylene glycol) Neo Carboxylate diphosphite.

EXAMPLE 4

Two moles of tris (dipropylene glycol) phosphite were heated with 1 mole of Ester diol 204 in the presence of 10 grams of diphenyl phosphite and two moles of dipropylene glycol were removed by distillation in vacuo to obtain tetra (dipropylene glycol) Neo Carboxylate diphosphite.

In naming the Ester diol 204 phosphite derivatives in the specification and claims the Ester diol 204 nucleus for convenience is given the coined name "Neo Carboxylate."

Examples of compounds within the invention having Formula I are tetra (dipropylene glycol), Neo Carboxylate diphosphite, tetra (tripropylene glycol) Neo Carboxylate diphosphite, tetra (polypropylene glycol 425) Neo Carboxylate diphosphite, tetra (polypropylene glycol 1025) Neo Carboxylate diphosphite, tetra (triethylene glycol) Neo Carboxylate diphosphite, tetra (polyethylene glycol molecular weight 1000) Neo Carboxylate diphosphite, tetra (ditetramethylene glycol) Neo Carboxylate diphosphite, tetra (tetramethylene glycol) Neo Carboxylate diphosphite, tetra (hexamethylene glycol) Neo Carboxylate diphosphite, di (dipropylene glycol) di (diethylene glycol) Neo Carboxylate diphosphite.

Examples of compounds within the invention having Formula II are hexa (dipropylene glycol) di (Neo Carboxylate) tetraphosphite, octa (dipropylene glycol) tri (Neo Carboxylate) hexaphosphite, tetradeca (dipropylene glycol) hexa, (Neo Carboxylate) dodecaphosphite, hexa-(diethylene glycol) di (Neo Carboxylate) tetraphosphite, hexa (tripropylene glycol di Neo Carboxylate) diphosphite hexa (ditetramethylene glycol) di (Neo Carboxylate) diphosphite, hexa (hexamethylene glycol) di (Neo Carboxylate) diphosphite.

As previously set forth the phosphites of Formulae I and II are useful in preparing flame resistant polyurethane products haivng outstanding hydrolytic stability.

The polyurethanes prepared according to the present invention are solids. They have good flame-proofing properties and in the foamed form are useful as linings for textiles, e.g., coats, suits and dresses, insulation in building construction, upholstery filling material, pillows, hair curlers, brushes, carpet underlays or backings, shock absorbent filling for packages, etc.

The unfoamed polyurethane products are useful whereever elastomeric polyurethanes can be employed with the advantage of improved flame and fire resistance. The elastomers in thread form can be employed in making girdles. The unfoamed polyurethanes are suitable for molding cups and other articles, and as protective coatings for steel, wood and glass.

The polyurethanes can be cured in conventional fashion, e.g., in an oven at 110° C.

As examples of organic polyisocyanates which can be employed to make the polyurethane there can be employed toluene-2,4-diisocyanate, toluene-2,6-diisocyanate, 4-methoxy-1,3-phenylene-diisocyanate, diphenyl methane-4,4'-diisocyanate, 4-chloro-1,3-phenylene-diisocyanate, 4-isopropyl-1,3-phenylene-diisocyanate, 4 - ethoxy-1,3-phenyl-enediisocyanate, 2,4-diisocyanatodiphenylether, 3,3'-dimethyl-4,4'-diisocyanatodiphenyl methane, mesitylene diisocyanate, durylene diisocyanate, 4,4'-methylene-bis (phenylisocyanate), benzidine diisocyanate, o-nitro-benzidine diisocyanate, 4,4'-diisocyanatodibenzyl, 3,3'-bitolylene 4,4'-diisocyanate, 1,5-naphthalene diisocyanate, tetramethylene diisocyanate, hexamethylene diisocyanate, decamethylene diisocyanate, toluene-2,4,6-triisocyanate, tritolylmethane triisocyanate, and 2,4,4'-triisocyanatodiphenyl ether, the reaction product of toluene diisocyanate with trimethylolpropane at an NCO/OH ratio of 2:1 (Mondur CB), the reaction product of toluene diisocyanate with 1,2,6-hexanetriol at NCO/OH ratio of 2:1, the reaction product of toluene diisocyanate with the polyol phosphite at an NCO/OH ratio of 2:1, e.g., when the polyol phosphite is dipropylene glycol tetrol diphosphite or tris (pentaerythritol-polypropylene glycol ether) phosphite, PAPI (polymethylene polyphenyl isocyanate.)

Alternatively, as the polyisocyanate there can be used prepolymers made by reacting one or more of the above polyisocyanates with a polyhydroxy compound such as a polyester having terminal hydroxyl groups, a polyhydric alcohol, glycerides, hydroxy containing glycerides, etc. The prepolymers should have terminal isocyanate groups. To insure this it is frequently desirable to employ an excess of 5% or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20%, 2,6-isomer of toluene diisocyanate was employed in making the prepolymer. Thus, there can be used the prepolymers from toluene diisocyanate and castor oil, toluene diisocyanate and blown tung oil (or blown linseed oil or blown soya oil), toluene diisocyanate and the polyester of ethylene glycol, propylene glycol and adipic acid having a molecular weight of 1900 described in Example I of Kohrn Patent 2,953,839, as well as the isocyanate terminated prepolymers in Examples II–VIII, inclusive, of the Kohrn patent, toluene diisocyanate and polytetramethylene glycol (1000 molecular weight), toluene diisocyanate and polypropylene glycol (molecular weight 1025), toluene diisocyanate and LG–56 (glycer-toluene diisocyanate and polypropylene glycol (molecular weight 1025), toluene diisocyanaate and LG–56 (glycerine-propylene oxide adduct having a molecular weight of 3000), toluene diisocyanate and 1,2,6-hexanetriol-propylene oxide adducts having molecular weights of 500, 700, 1500, 2500 3000 and 4000, hexamethylene diisocyanate and pentaerythritol, toluene diisocyanate and polyethylene sebacate, toluene diisocyanate and a mixture of 98% polypropylene glycol (molecular weight 1900) with 2% 1,2,6-hexanetriol, toluene diisocyanate and a copolymer of ethylene oxide and propylene oxide having a molecular weight of 2020, toluene diisocyanate and glyceryl adipate phthalate polymer, toluene diisocyanate and a mixture of polypropylene ether glycol molecular weight 995 and castor oil as described in Example 2 of Kane Patent 2,955,091, as well as the other prepolymers set forth in Examples 1 and 3-11 of Kane, toluene diisocyanate and polypropylene ether glycol (molecular weight 1800) of Example I of Swart Patent 2,915,496 and the prepolymers of Examples II, III, VI and VIII of the Swart patent: Toluene diisocyanate and tris (dipropylene glycol) phosphite; toluene diisocyanate and tris (polypropylene glycol 2025) phosphite.

As previously stated, the polyol phosphites of the present invention can be the sole hydroxyl reactant present or they can be used in admixture with other polyhydroxy compounds in forming the polyurethanes. Examples of such compounds are polyethylene glycols having molecular weights of 400 to 3000, polypropylene glycols having molecular weights of 400 to 3000, ethylene glycol, diethylene glycol, triethylene glycol, propylene glycol, dipropylene glycol, tripropylene glycol, 1,4-butanedio thiodiglycol, glycerol, trimethylolethane, trimethylolpropane, ether triols from glycerine and propylene oxide having molecular weights of 1000 and 3000 (available commercially as LG–168 and LG–56, respectively,) ether containing triols from 1,2,6-hexanetriol and propylene oxide having molecular weights of 750, 1500, 2400, and 4000 (available commercially as LHT 240, LHT 112, LHT 67 and LHT 42, respectively), sorbitol-propylene oxide adduct having a molecular weight of 1000 pentaerythritol-propylene oxide adduct having a molecular weight of 1000, trimethylol phenol, oxypropylated sucrose, triethanolamine, pentaerythritol, diethanolamine, castor oil, blown linseed oil, blown soya oil, N,N,N'N'-tetrakis (2-hydroxyethyl) ethylenediamine, N,N,N',N'-(2-hydroxypropyl) ethylenediamine, mixed ethylene glycol-propylene glycol adipate resin (molecular weight 1900) polyethylene adipate phthalate, polyneopentylene sebacate, the product made by reacting an excess of 1,4-butanediol with adipic acid and including a small amount of triol, e.g., one molar equivalent of trimethylol propane for each 3000 to 12,000 molecular weight units of polyester, polyester from 16 moles adipic acid, 16 moles diethylene glycol and 1 mole of trimethylol propane, oxypropylated p-tertiary butylphenolformaldehyde resin of Example 2b of De Groote Patent 2,499,365 and the other oxyalkylated resins of De Groote, tris (dipropylene glycol) phosphite, and tris (polypropylene glycol 2025) phosphide.

From 5 to 100% by weight of the hydroxyl component can be the polyol phosphites of the present invention.

Foamed polyurethanes can be obtained by adding water prior to or simultaneously with the addition of the polyisocyanate.

Alternatively foams can be prepared by uniformly distributing a liquefied halogen substituted alkane containing at least one fluorine atom in its molecule and having a boiling point at one atmosphere pressure not higher than 80° F. and preferably not lower than −60° F. in either the phosphite (or mixture of phosphite and other polyhydroxy compound) reactant or the polyisocyanate reactant and then mixing the reactants and permitting the temperature of the mixture to rise during the ensuing reaction above the boiling point of the liquefied gas to produce a porous polyurethane. Such fluorine containing compounds include dichlorodifluormethane, dichloromonofluoromethane, chlorodifluoromethane, and dichlorotetrafluoromethane. The foams can be formed with such fluorine containing compounds in the manner described in General Tire British Patent 821,342.

In preparing the cured and/or foamed polyurethanes any of the conventional basic catalyst, e.g. 0.001 to 5% of the mixture of N-methyl morpholine, N-ethyl morpholine, 1,2,4-trimethylpiperazine, trimethyl amine, triethyl amine, tributyl amine and other trialkyl amines, the esterification product of 1 mole of adipic acid and 2 moles of diethylethanolamine triethyl amine citrate, 3 - morpholinopropionamide, 1,4 - bis(2-hydroxypropyl)-2-methyl-piperazine, 2 - diethylaminoacetamide, 3 - diethylaminopropionamide, diethylethanolamine, triethylenediamine, N,N,N',N' - tetrakis (2-hydroxypropyl) ethylenediamine (Quadrol), N,N'-dimethylpiperazine, N,N-dimethylhexahydroaniline, N,N,N',N'-tetramethyl-1,3-butanediamine, tribenzylamine and sodium phenolate. There can also be used tin compounds e.g. hydrocarbon tin acylates such as dibutyltin dilaurate, dibutyltin diacetate, dibutyltin dioctoate, tributyltin monolaurate, dimethyltin diacetate, dioctyltin diacetate, dilauryltin diacetate, dibutyltin maleate, hydrocarbon tin alkoxides, e.g., dibutyltin diethoxide, dibutyltin dimethoxide, diethyltin dibutoxide as well as other tin compounds, e.g., octylstannoic acid, trimethyltin hydroxide, trimethyltin chloride, triphenyltin hydride, triallyltin chloride, tributyltin fluoride, dibutyltin dibromide, bis (carbomethoxymethyl) tin diiodide, tributyltin chloride, trioctyltin acetate, butyltin trichloride, octyltin tris-(thiobutoxide), dimethyltin oxide, dibutyltin oxide, dioctyltin oxide, diphenyltin oxide, stannous octanoate, stannous octoate, as well as the other tin compounds set forth in Hostettler French Patent 1,212,252.

Conventional surfactants can be adedd in the amount of 1% or less, e.g., 0.2% by weight of the composition, The preferred surfactants are silicons, e.g., polydimethyl siloxane having a viscosity of 3 to 100 centistokes, triethoxydimethyl polysiloxane, moleculer weight 850 copolymerized with a dimethoxypolyethylene glycol having a molecular weight of 750, as well as any of the other siloxanes disclosed in Hostettler French Patent 1,212,252.

Unless otherwise indicated, all parts and percentages are by weight.

In making the urethane foams in the following examples there was used the following formulation.

FORMULATION A

| | Gram |
|---|---|
| Water | 0.37 |
| Dibutyltin dilaurate | 0.07 |
| Polydimethyl siloxane | 0.12 |
| N-ethyl morpholine | 0.1 |
| Polyol as indicated | |

In the examples the toluene diisocyanate was a mixture of 80% of the 2,4 isomer and 20% of the 2,6 isomer.

EXAMPLE 5

In the Formulation A there was used 2.4 grams of tetra (dipropylene glycol) Neo Carboxylate diphosphite. Upon addition of 5.2 grams of toluene diisocyanate there was a rapid cream time and rise. The foam was cured in a 110° C. oven for about 20 minutes to produce a solid, hydrolysis resistant, rigid self-extinguishing foam.

EXAMPLE 6

The polyol used in Formulation A was a mixture of 1.4 ml. (about 1.4 grams) of tetra (dipropylene glycol) Neo Carboxylate diphosphite and 6 grams of LG–56. Upon addition of 5.2 grams of toluene diisocyanate there was a rapid cream time and rise. The product was rigid and self extinguishing as well as being hydrolysis resistant.

EXAMPLE 7

The procedure of Example 5 was repeated replacing the tetra (dipropylene glycol) Neo Carboxylate diphosphite by 3.2 grams of hexa (dipropylene glycol) di (Neo Carboxylate) tetraphosphite to produce a rigid, self-extinguishing, hydrolysis resistant solid foam.

What is claimed is:

1. A polyurethane comprising the reaction product of an organic polyisocyanate and a phosphite having one of the formulae selected from the group consisting of (a)

$$\begin{array}{c} RO \\ \diagdown \\ RO \diagup \end{array} P-O-CH_2-\underset{\underset{CH_3}{|}}{\overset{\overset{CH_3}{|}}{C}}-CH_2-O-\overset{\overset{O}{\|}}{C}-\underset{\underset{CH_3}{|}}{\overset{\overset{CH_3}{|}}{C}}-CH_2-OP \begin{array}{c} \diagup OR \\ \diagdown OR \end{array}$$

and (b)

$$\begin{array}{c} RO \\ \diagdown \\ RO \diagup \end{array} P-OR_1-O-P \underset{\underset{R}{|}}{\overset{}{\left[}} -OR_2-O-\underset{\underset{R}{|}}{\overset{\overset{O}{\|}}{P}}-OR_1O-\underset{\underset{OR}{|}}{\overset{}{P}}-O \overset{}{\right]_m} -R$$

where

R is selected from the group consisting of $HOC_nH_{2n}O-$ and $HOC_xH_{2x}(OC_xH_{2x})_y-$ $R_2$ is selected from the group consisting of $-C_nH_{n2}-$ and $-C_xH_{2x}(OC_xH_{2x})_y-$;

$R_1$ is $$-CH_2-\underset{\underset{CH_3}{|}}{\overset{\overset{CH_3}{|}}{C}}-CH_2O-\overset{\overset{O}{\|}}{C}-\underset{\underset{CH_3}{|}}{\overset{\overset{CH_3}{|}}{C}}-CH_2-$$

$n$ is an integer of 4 to 6 there also being at least four carbon atoms separating the oxygen atoms attached to $C_nH_{2n}$; $x$ is an integer of 2 to 4 inclusive and $y$ is an integer of 1 to about 34 and $m$ is a small integer of 1 to 6.

2. A polyurethane according to claim 1 wherein the phosphite employed has Formula (a) and all of the R groups are $HOC_xH_{2x}(OC_xH_{2x})_y-$.

3. A polyurethane according to claim 1 wherein the phosphite employed is a tetra (polypropylene glycol) Neo Carboxylate diphosphite.

4. A polyurethane according to claim 1 wherein the phosphite employed is tetra (dipropylene glycol) Neo Carboxylate disphosphite.

5. A polyurethane according to claim 1 wherein the phosphite employed has Formula (b), all of the R groups are $HOC_xH_{2x}(OC_xH_{2x})_y-$ and $R_2$ is $$-C_xH_{2x}(OC_xH_{2x})_y-$$

6. A polyurethane according to claim 1 wherein the phosphite employed is a poly (polypropylene glycol) poly (Neo Carboxylate) polyphosphite having 2 to 6 Neo Carboxylate groups, having twice as many phosphite groups as Neo Carboxylate groups and having two more polypropylene groups than phosphite groups.

7. A polyurethane according to claim 2 wherein the polypropylene glycol groups are dipropylene glycol groups.

8. A polyurethane according to claim 1 wherein the phosphite employed is hexa (dipropylene glycol) di (Neo Carboxylate) tetraphosphite.

References Cited

UNITED STATES PATENTS 3,428,577   2/1969   Merten et al. _____ 260–2.5

DONALD E. CZAJA, Primary Examiner

M. J. WELSH, Assistant Examiner.

U.S. Cl. X.R.

117—124, 132, 148; 260—18, 45.85, 45.95, 75, 77.5, 928, 929, 982